United States Patent
Wall

[11] 3,727,043
[45] Apr. 10, 1973

[54] ORNAMENTAL GLOBE UTILIZING OPTICAL FIBERS

[75] Inventor: Lamar J. Wall, Seal Beach, Calif.

[73] Assignee: Poly-Optics, Inc., Santa Ana, Calif.

[22] Filed: June 11, 1971

[21] Appl. No.: 152,305

[52] U.S. Cl. ..........................240/10 T, 240/1 EL
[51] Int. Cl. ..............................A47g 33/16
[58] Field of Search.................240/10 R, 10 P, 10 S, 240/10 T, 1 EL

[56] References Cited

UNITED STATES PATENTS

| | | | |
|---|---|---|---|
| 2,016,794 | 10/1935 | Bade et al. | 240/10 P |
| 3,018,362 | 1/1962 | Joyce | 240/10 R |
| 3,431,410 | 3/1969 | Dolan et al. | 240/1 EL X |
| 3,532,874 | 10/1970 | Rosenast | 240/1 E X |
| 3,609,343 | 9/1971 | Howlett | 240/10 R |
| 3,624,385 | 11/1971 | Wall | 240/10 P |

FOREIGN PATENTS OR APPLICATIONS

| | | | |
|---|---|---|---|
| 1,805,786 | 5/1970 | Germany | 240/1 EL |

*Primary Examiner*—Richard C. Queisser
*Assistant Examiner*—Joseph W. Roskos
*Attorney*—Nilsson, Robbins, Willis & Berliner

[57] ABSTRACT

An illuminated globe carrying sprays of optical fibers in which a hollow globular body is formed with openings for receiving the bundled ends of a plurality of optical fiber sprays. An electric lamp within the hollow body illuminates the optical fibers.

9 Claims, 4 Drawing Figures

PATENTED APR 10 1973 3,727,043

INVENTOR.
LAMAR J. WALL
BY
NILSSON, ROBBINS, WILLS & BERLINER
ATTORNEYS

ORNAMENTAL GLOBE UTILIZING OPTICAL FIBERS

FIELD OF THE INVENTION

The fields of art to which the invention pertains include the fields of optics and radiant energy, particularly with respect to light conducting rods, such as optical fibers, and decorative lights including displays and ornaments.

BACKGROUND AND SUMMARY OF THE INVENTION

The advent of modern manufacturing procedures for fabricating plastic as well as glass optical fibers has made such fibers available for decorative purposes. In such utility, the fibers are often bundled together at one end with the fibers at the other end unrestrained to flare outwardly forming a spray or bouquet of light. An illumination source for the fibers must be provided and this has generally been accomplished by the special construction of a holder including a light bulb and particularly adapted to maintain the light receiving bundled ends of the fibers a predetermined distance from the bulb. The holder is shaped internally to concentrate light from the bulb onto the bundled fiber ends and provision can be made for disposing a light filter and/or heat reflector between the light bulb and bundled fiber ends. Such structures enable the utilization of optical fibers for a variety of decorative purposes whereby unique aesthetic lighting effects can be achieved. The holders themselves have been designed with aesthetic exterior lines so that they can be in view without detracting from the visual pleasantness of the effect. In further developments, adapters have been developed to connect a fiber spray to a low voltage bulb of the Christmas tree type and to dispose the bundled ends of the spray in close proximity to the bulb.

The present invention provides a decorative illumination device in which one or a plurality of optical fiber sprays are decoratively supported with the light receiving ends of the fibers illuminated by an incorporated electric lamp. In particular, the illumination device comprises a hollow globular body, an electric lamp within the hollow body, and one or more optical fiber sprays projecting from the hollow body. Each spray comprises a plurality of flexible optical fibers having light emitting and light receiving ends and means for bundling the light receiving ends. The hollow body defines a number of openings spaced thereabout to dispose the bundled ends of the fiber sprays internally of the body for illumination by the lamp. The globular body is formed with a dependent neck through which the electric lamp and holder therefor is inserted, and means are provided for securing the lamp holder internally of the neck. In particular embodiments, the fiber bundling means comprises a termination member short relative to the length of the fibers and which constitutes the sole fiber contact support, the openings in the globe being defined to close-fit the termination member. The fibers are unrestrained and flare outwardly from the termination member. The globular body can be formed of opaque, translucent or transparent material.

DETAILED DESCRIPTION

As required, detailed illustrative embodiments of the invention are disclosed herein. However, it is to be understood that these embodiments merely exemplify the invention which may take many forms substantially different from the specific illustrative embodiments disclosed. Therefore, specific structural and functional details are not to be interpreted as limiting, but merely as a basis for the claims.

Figure 1:
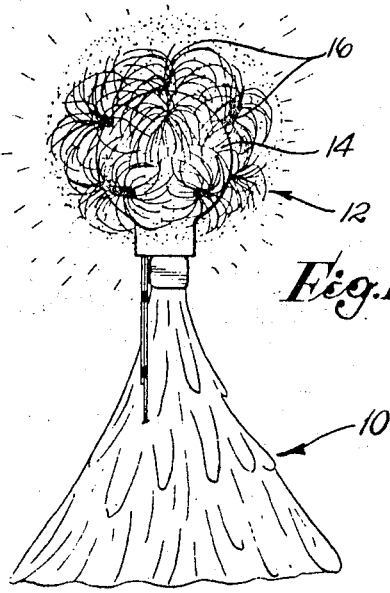
FIG. 1 is a perspective view of a Christmas tree top carrying a device of this invention.

Referring to FIG. 1, there is shown a Christmas tree top 10 which carries at its apex a globular optical fiber ornament 12 constructed in accordance with this invention. The ornament 12 includes a hollow globular body 14 carrying a plurality of sprays 16 of optical fibers, generally evenly distributed around the surface of the globe 14. Each spray 16 includes a plurality of optical fibers, typically about 80, flaring outwardly from a mounting member so that the outer ends of each spray 16 are radially directed. The outer fibers of adjacent sprays meet to present the appearance of a light sphere defined by a multitude of light points, in fact, over 700 light points. The globe 14 can be opaque, translucent or transparent and in any case the result is an ornament having a unique ethereal appearance and providing dramatic imagery effects not heretobefore obtainable.

Figure 2:
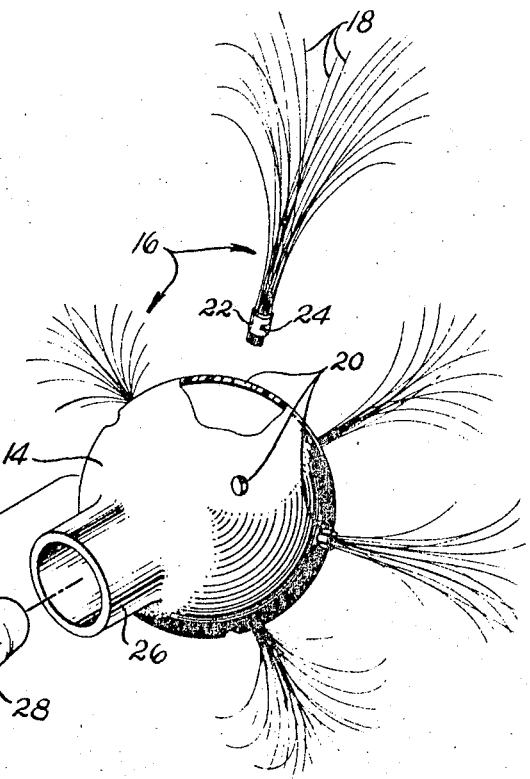
FIG. 2 is an exploded, partially cut-away view of an illumination device of this invention.

Referring to FIG. 2, the globe 14 can be made of opaque materials such as metal, plastic coated with metal or sufficiently pigmented to be opaque, or it can be made of glass, clear plastic or other translucent or transparent material as desired. The globe 14 is formed with a plurality of openings 20 dispersed thereabout in correspondence to the number of optical fiber sprays 16 to be utilized. In this embodiment, nine such sprays 16 are distributed generally evenly about the surface of the globe 14. As previously indicated, each spray 16 includes a large number of individual fibers 18, for example, 80 fibers, and the fibers 18 are bundled at one end with a member 22 which is short relative to the length of the fibers 18 and which can take the form of a sleeve of metal, plastic or the like.

In this illustration, the bundling member 22 comprises a termination in the form of a metallic sleeve obtained by disposing a metallic band transverse of the gathered fibers and deforming the band with a punch press to overlap its ends. The band is keyed, at 24, during the punch press operation to provide a gripping edge to secure the member 22 within the globe aperture 20. In place of the deformed band, one can utilize a metallic or plastic grommet, or alternatively, one can merely apply adhesive to the bundled fiber ends. In any event, the bundling member or means constitutes the sole fiber contact support and the fibers 18 are flexible and unrestrained so as to flare outwardly from the bundling member. The flexibility of the fibers 18 is important to obtaining an ethereal imagery affect. The bundled fiber ends are disposed internally of the globe 14 for illumination by the electric lamp 28. The light impinging upon the bundled fiber ends is transmitted to the opposite flared ends of the fibers 18 to appear thereat as tiny sparkles of light.

The globe 14 is formed with a cylindrical dependent neck 26 into which is inserted an electric lamp 28 threaded into a bulb holder 30. A pair of resiliently deformable members 32 and 34 are secured on opposite sides of the bulb holder 30 and are formed to spring outwardly so as to exert a spring force against the internal surface of the neck 26 when the holder 30 is inserted into the neck 26. Each deformable member is formed laterally with oppositely disposed sharp points 36 for biting into the material of the globe constituting the inner surface of the neck 26, to thereby prevent the bulb holder 30 from being pulled out of the neck 26, except by purposely squeezing together the resilient members 32 and 34. The bulb holder is formed with contacts for the electric lamp 28 and wires leading therefrom. A stiffening bar 40 is secured to the wires 38 by means of tape 42 or the like and extends into the holder 30 so as to provide a support for mounting the illumination device on a Christmas tree or other appropriate place.

Figure 3:
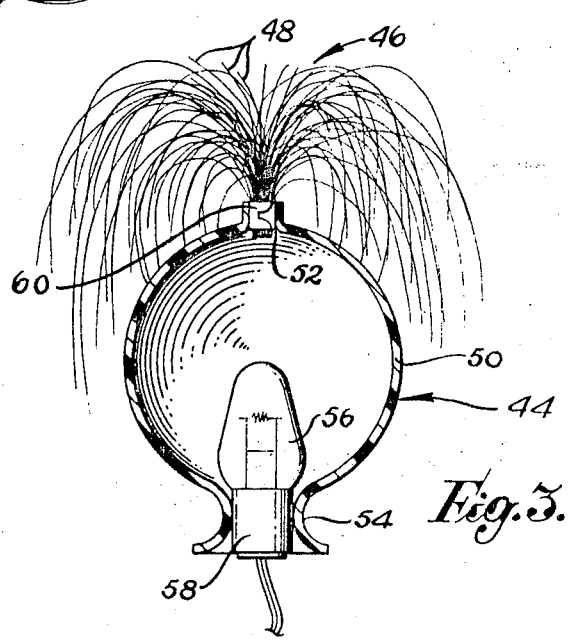
FIG. 3 is a cross-sectional view of an alternative illumination device.

Referring now to FIG. 3, an alternative illumination device 44 is illustrated. The illumination device 44 includes a globe 50 formed, in this case, with an opening 52 to accommodate the bundled fiber ends of only a single spray 46 of optical fibers 48. The globe 50 is formed with a dependent neck 54, directly opposite the spray opening 52, through which an electric lamp 56 and holder 58 therefor can be inserted. In this embodiment, the fiber spray 46 extends directly from the top of the globe 50, but other embodiments can be provided wherein the spray extends laterally from the globe or otherwise. The fibers 48 can be formed identically to the fibers 18 of the embodiment illustrated in FIG. 2, or they can be substantially longer as shown, so as to flare sufficiently outwardly to bend back upon itself and terminate at a point approaching or beyond the point of contact of the bundling member 60 with the glove 50. This latter configuration is particularly suitable to the top positioning of the spray 46.

The neck is curved inwardly to close-fit the bulb holder 58 to thereby press fit the holder 58. Alternatively, the neck could be cylindrically shaped as illustrated in FIG. 2 and other securement means utilized.

The ornament illustrated in FIG. 3 can be utilized as a topper or a plurality of such ornaments can be strung around the tree to provide a unique and pleasant decorative effect.

Figure 4:
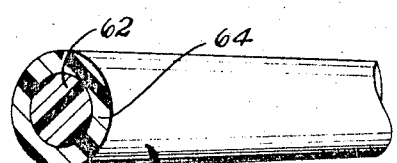
FIG. 4 is a perspective view of an optical fiber utilized in this invention.

Referring to FIG. 4, each optical fiber, such as 18, comprises a central light conducting core 62 encased within a light reflecting jacket 64. The optical fiber 18 is constructed of materials well known to the art wherein the light conducting core 62 has a higher index of refraction than the jacket 64. For example, a core 62 can be formed of polystyrene having an index of refraction of 1.60 and the jacket 64 can be formed of a polymethylmethacrylate having an index of refraction of 1.49. Methods of forming such fibers are well known in the art. For use in the present invention, a balance should be struck between flexibility of the fibers and light emitting capability. The fibers must be sufficiently flexible so as to flare outwardly from their support and yet the fibers should conduct sufficient light to be decoratively aesthetic. To obtain an aesthetically attractive display, one can utilize optical fibers having diameters of 7 mils or more.

I claim:

1. A decorative device, comprising:
   a plurality of optical fiber sprays, each spray comprising a plurality of flexible optical fibers having light emitting and light receiving ends and means for bundling said light receiving ends, ends, said fibers being unrestrained to flare radially outwardly from said bundling means;
   a hollow globular body; and
   an electric lamp within said hollow body;
   said said hollow body defining a plurality of openings, corresponding in number to said plurality of sprays, each opening being formed to receive the bundled optical fiber ends of one of said sprays to dispose said bundled ends internally of said body for illumination by said lamp, said openings being spaced so that the outer fibers of adjacent sprays meet to provide, when said lamp is lit, a substantially spheroid layer spaced outwardly from the surface of said globular body and defined by a multitude of light points constituting the ends of said fibers.

2. The invention according to claim 1 in which said globular body is formed with a dependent neck through which said electric lamp is inserted into said body.

3. The invention according to claim 2 including a holder for said electric lamp and means for securing said holder internally of said globular body neck.

4. The invention according to claim 2 including a holder for said electric lamp, said neck being formed to press fit said holder.

5. The invention according to claim 1 in which said bundling means comprises a member short relative to the length of said fibers and said opening is defined to close-fit said member.

6. The invention according to claim 1 in which said bundling means comprises a member short relative to the length of said fibers and which constitutes the sole fiber contact support.

7. The invention according to claim 1 in which the bundled ends of said fibers are disposed adjacent said lamp.

8. The invention according to claim 1 in which said globular body is opaque.

9. The invention according to claim 1 in which said globular body is transparent or translucent.

* * * * *